United States Patent
Ohba

(10) Patent No.: US 6,369,823 B2
(45) Date of Patent: *Apr. 9, 2002

(54) PICTURE PROCESSING APPARATUS AND PICTURE PROCESSING METHOD

(75) Inventor: Akio Ohba, Kanagawa (JP)

(73) Assignee: Sony Computer Entertainment Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/778,159

(22) Filed: Feb. 5, 2001

Related U.S. Application Data

(63) Continuation of application No. 08/945,580, filed as application No. PCT/JP97/00535 on Feb. 25, 1997, now Pat. No. 6,211,890.

(30) Foreign Application Priority Data

Feb. 29, 1996 (JP) ................................................ 8-043760

(51) Int. Cl.$^7$ ................................................. G06T 1/20
(52) U.S. Cl. ........................................ 345/506; 345/556
(58) Field of Search ............................. 345/419, 501, 345/502, 506, 556, 522, 430, 530; 463/30, 32, 43, 45

(56) References Cited

U.S. PATENT DOCUMENTS

| 5,791,994 A | 8/1998 | Hirano et al. |
| 5,793,376 A | 8/1998 | Tanaka et al. |

FOREIGN PATENT DOCUMENTS

| EP | 0 646 876 | 4/1995 |
| EP | 0 674 276 | 9/1995 |
| JP | 2-64779 | 3/1990 |
| JP | 5-30138 | 2/1993 |
| JP | 8-171657 | 7/1996 |

*Primary Examiner*—Kee M. Tung
(74) *Attorney, Agent, or Firm*—Fulwider Patton Lee & Utecht, LLP

(57) ABSTRACT

A main CPU 11, a main memory 12, a main DMAC (direct memory access controller) 13 and a picture processing unit (graphic processing unit or GPU) 15 are interconnected over a main bus 1. In an input/output unit of each of the main CPU 11 and the GPU 15 are mounted programmable packet engines (PPE) 112, 152 capable of modifying the data packetizing/unpacketizing sequence in order to perform packet transfer with freedom in the packet form. This affords freedom to the packet form to realize efficient development and packing of packet data and efficient drawing processing.

5 Claims, 10 Drawing Sheets

PICTURE PROCESSING APPARATUS AND PICTURE PROCESSING METHOD

RELATED APPLICATIONS

This is a continuation of Ser. No. 08/945,580 filed Jun. 29, 1998 now U.S. Pat. No. 6,211,890 which is a 371 of PCT/JP97/00535 filed Feb. 25, 1997.

TECHNICAL FIELD

This invention relates to a picture processing apparatus and a picture processing method employed in a graphics computer, special effect device or a video game, which are picture equipments employing a computer.

BACKGROUND ART

In a TV game machine for household use, a personal computer or in a graphics computer, a picture processing apparatus for generating data of a picture outputted and displayed on a TV receiver, monitor receiver, cathode ray tube (CRT) or on a display device, that is display output picture data, is constructed as the combination of a general-purpose memory chip, a central processing unit (CPU) or other processing chips. High-speed processing is enabled by providing a dedicated drawing device between the CPU and a frame buffer.

Specifically, with the above picture processing apparatus, the CPU does not access the frame buffer directly in generating a picture. Instead, the CPU performs geometric processing operations, such as coordinate transformation, clipping or light source calculations and formulates drawing commands for defining a three-dimensional model for drawing a three-dimensional picture as a combination of triangular or quadrangular basic unit figures (polygons) to send the drawing commands over an external bus to the drawing device. For example, for displaying a three-dimensional object, the latter is dissolved into plural polygons and drawing commands associated with the respective polygons are transmitted from the CPU to the drawing device, which then interprets the drawing commands sent from the CPU to the drawing device and calculates the colors of all pixels making up the polygons and the Z-values from the Z-value specifying the color data and depth of apices. The drawing device then performs rendering processing of writing the pixel data in the frame buffer to delineate a figure on the frame buffer. Meanwhile, the Z-value is the information specifying the distance along the depth from the viewing point.

For example, if a three-dimensional object is displayed on the picture generating device, the object is dissolved into plural polygons and the drawing command corresponding to the polygons is transferred from the CPU to the drawing device. For displaying the object more realistically, a technique known as texture mapping or mip mapping is used. There is also known a technique of converting color data of a picture via a color lookup table (CLUT) holding on memory the color conversion data for varying the display colors.

The texture mapping is a technique of bonding a two-dimensional picture (picture pattern), separately provided as a texture source picture, that is a texture pattern, on the surface of a polygon constituting an object. The mip mapping is among texture mapping techniques of interpolating pixel data so that, on approaching to or receding away from a three-dimensional model, the picture pattern bonded to the polygon will not depart from spontaneity.

In a calculation processing system constituted by combining general-purpose memory chips, CPU or other calculation chips, such as TV game machines for household use or personal computers, the memory operating speed or the performance of the external bus is not improved as compared to improvement in the operating frequency of calculation chips or circuit size, such that the external bus proves to be a bottleneck. The memory bus system having a large data transfer volume is generally high in latency and exhibits high performance in large-capacity burst transfer. However, the performance of the memory bus system is not exhibited for a small-capacity random transfer, such as in ordinary CPU accessing.

If a pre-fixed packet, such as a command packet, is used, efficient transfer can be achieved by exploiting a direct memory access controller (DMAC). However, the multifarious algorithm cannot be coped with thus giving rise to redundancy.

The CPU commands are consumed in the packet format and reformat thus lowering the efficiency. If the system has a cache, long packets sufficient to accommodate the packet length cannot be set, such that the burst is usually set to four words and hence the performance of the memory system of the larger data transfer volume cannot be displayed.

In view of the above-described status of the prior art, the present invention has the following objects:

Specifically, an object of the present invention is to reduce the above-mentioned bottleneck in the picture processing apparatus combined from the general-purpose memory chip, CPU and the lie calculation chip.

Another object of the present invention is to provide a picture processing apparatus and a picture processing method for raising the data transfer efficiency.

A further object of the present invention is to provide a picture processing apparatus and a picture processing method for raising the data efficiency on a memory.

A further object of the present invention is to provide a picture processing apparatus and a picture processing method for raising the efficiency in packet data development and packaging efficiency.

A further object of the present invention is to provide a picture processing apparatus and a picture processing method for affording freedom to the packet form.

A still another object of the present invention is to provide a picture processing apparatus and a picture processing method for enabling burst transfer suited to the packet form.

DISCLOSURE OF THE INVENTION

The present invention provides a picture processing apparatus having a plurality of picture processing units interconnected over an external bus and a memory, wherein there is provided a first packet engine at a data inlet stage of at least one picture processing unit. The first packet engine can modify the data unpacketizing sequence. Thus, with the picture processing apparatus according to the present invention, the packet form may be afforded with freedom to achieve high efficiency in data transfer and in memory data.

With the picture processing apparatus of the present invention, a second packet engine for packetizing data is provided at a data output stage of an other picture processing unit.

With the picture processing apparatus of the present invention, the second packet engine appends the appendage information specifying the unpacketizing sequence associated with the packetizing sequence to a packet at the time of data packetizing. The first packet engine performs data unpacketizing in accordance with the sequence specified by the appendage information at the time of unpacketizing. The packet engines in the picture processing apparatus according to the present invention affords freedom to the packet form for realizing efficient packet data development and packing.

With the picture processing apparatus of the present invention, the first and second packet engines have sequence selection means for selecting the data packetizing/unpacketizing sequence. The second packet engine appends the tag information specifying the data packetizing/unpacketizing sequence as selected during packetizing by the sequence selection means to a packet. The first packet engine selects the sequence as designated by the tag information during unpacketizing by the sequence selection means. The packet engines in the picture processing apparatus according to the present invention affords freedom to the packet form for realizing efficient packet data development and packing.

With the picture processing apparatus of the present invention, there is provided a first picture processing unit having a geometry processing function of defining a three-dimensional model as a combination of unit figures for formulating drawing commands for drawing a three-dimensional figure. The first picture processing unit packetizes the drawing commands thus formulated to send the packetized drawing commands by the first packet engine as a command packet over an external bus. There is also provided a second picture processing unit, as the above-mentioned picture processing units, for unpacketizing the command packet sent from the first picture processing unit by the first packet engine, interpreting the drawing command sent as the command packet and performing the rendering processing of writing the pixel data in a frame buffer. The picture processing apparatus thus can perform efficient drawing processing.

The present invention also provides a picture processing method carried out by a picture processing apparatus having a plurality of picture processing units interconnected over an external bus and a memory. The picture processing method includes performing data unpackatizing by a first packet engine at a data inlet stage of at least one picture processing unit. The first packet engine can modify a data unpacketizing sequence. With the picture processing method of the present invention, the packet form may be afforded with freedom for achieving high data transfer efficiency and higher memory data efficiency.

With the picture processing method of the present invention, data packetizing is performed by a second packet engine provided at a data output stage of an other picture processing unit.

With the picture processing method of the present invention, the second packet engine appends the appendage information specifying the unpacketizing sequence associated with the packetizing sequence to a packet at the time of data packetizing, and data unpacketizing is performed by the first packet engine in accordance with the sequence specified by the appendage information at the time of data unpacketizing. Thus the picture processing method according to the present invention affords freedom to the packet form for realizing efficient packet data development and packing.

The picture processing method of the present invention also includes selecting the data packetizing/unpacketizing sequence during data packetizing and appending the tag information specifying the data packetizing/unpacketizing sequence during the data packetizing to a packet, by the second packet engine, and selecting the unpacketizing sequence as designated by the tag information during data unpackaging by the first packet engine for performing the data unpackaging. Thus the picture processing method according to the present invention affords freedom to the packet form for realizing efficient packet data development and packing.

The picture processing method of the present invention also includes performing, by a first picture processing unit, geometry processing of defining a three-dimensional model as a combination of unit figures for formulating drawing commands for drawing a three-dimensional figure, packetizing the drawing commands thus formulated by the second packet engine and sending the packetized commands as a command packet over an external bus, and unpacketizing, in a second picture processing unit, the command packet sent from the first picture processing unit by the first packet engine, interpreting the drawing command sent as the command packet and performing the rendering processing of writing the pixel data in a frame buffer. Thus the picture processing apparatus according to the present invention can efficiently perform drawing processing.

Thus, according to the present invention, the bottleneck in the conventional picture processing apparatus constructed by combination of the general-purpose memory chips, CPU or other calculation chips can be alleviated.

BEST MODE FOR CARRYING OUT THE INVENTION

Figure 1:
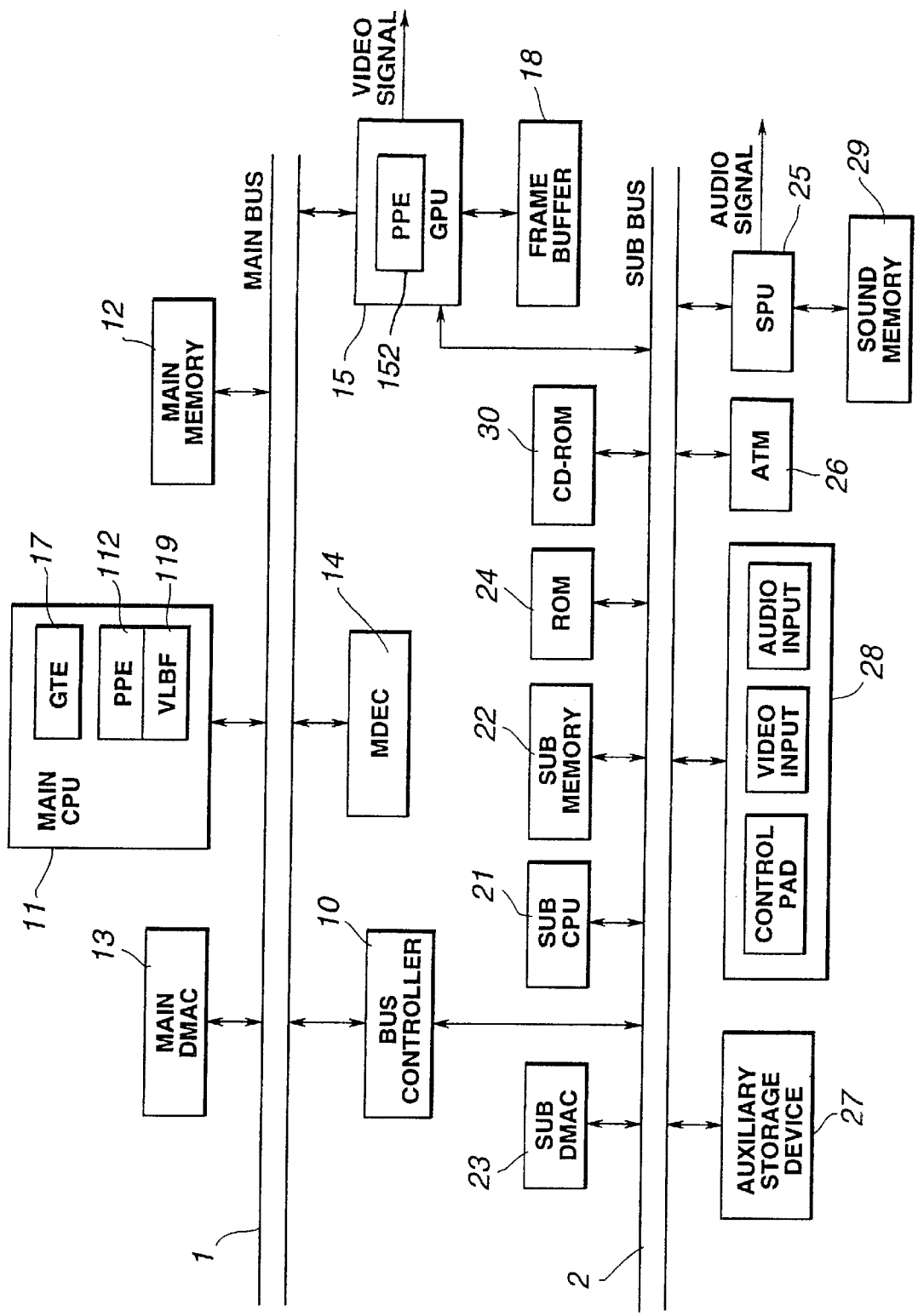
FIG. 1 is a block diagram showing the structure of a video game device embodying the present invention.

Referring to the drawings, preferred embodiments of the present invention will be explained in detail.

The present invention is applied to a video game device configured as shown for example in FIG. 1. The video game device, which reads out a game program stored on, for example, an optical disc and executes the program for carrying out the game in accordance with the commands from the user, is configured as shown in FIG. 1.

Specifically, the video game device has two sorts of buses, that is a main bus 1 and a sub-bus 2. The main bus 1 and the sub-bus 2 are interconnected via a bus controller 10.

To the main bus 1 are connected a main central processing unit (main CPU) 11, a main memory 12 made up of a random access memory (RAM), a main direct memory access controller (main DMAC) 13, a MPEG decoder 14 and a picture processing unit or graphics processing unit (GPU) 15. To the sub-bus 2 are connected a subsidiary central processing unit (sub-CPU) 21, made up of a microprocessor, a subsidiary memory 22, made up of a random access memory (RAM), a subsidiary direct memory access controller (sub-DMAC) 23, a read-only memory (ROM) 24 holding on memory a program, such as an operating system, a sound processing unit (SPU) 25, a communication controller, that is an asynchronous transmission module (ATM) 26, a subsidiary storage device 27, an input device 28 and a CD-ROM drive 30.

The bus controller 10 is a device on the main bus 1 for switching between the main bus 1 and the sub-bus 2, and is opened in an initial state.

The main CPU 11 is a device on the main bus 1 operating in accordance with the program on the main memory 12. Since the bus controller 10 is opened on startup, the main CPU 11 reads the boot program from the ROM 24 on the sub-bus 2 and reproduces the application program and the necessary data from the CD-ROM by the CD-ROM driver 30 for loading on the main memory 12 and on the devices on the sub-bus 2. On the main CPU 11 is loaded a geometry transfer engine (GTE) 17 for performing coordinate transformation. On an input/output unit of the main CPU are loaded a programmable packet engine (PPE) 112 for data packetizing/unpacketizing with a sequence that can be modified, and a variable length read/write buffer (VLBF) 117.

The GTE 17 includes a parallel processing mechanism for executing plural calculations in parallel, and performs calculations, such as coordinate transformation, light source calculations, matrix or vector calculations, responsive to requests for calculations from the main CPU 11. The main CPU 11 defines a three-dimensional model, as a combination of basic unit figures (polygons), such as triangles or quadrangles, based on the results of calculations executed by the GTE 17, for formulating drawing commands associated with the respective polygons for drawing the three-dimensional figure. The PPE 112 packetizes the drawing commands to form command packets which are transmitted over the main bus 1 to the GPU 15.

The main DMAC 13 is a device on the main bus 1 for executing control, such as DMA control, on the devices on the main bus 1. If the bus controller 10 is opened, the main DMAC 13 performs control on the devices on the sub-bus 2.

The GPU 15 is a device on the main bus 1 performing as a rendering processor. On the input/output unit of the GPU 15 is mounted a programmable packet engine (PPE) 152, the data packetizing/unacketizing sequence of which can be modified. The PPE 152 unpacketizes the command packet and the object data sent from the main CPU 11 or the main DMAC 13. The GPU 15 interprets the drawing commands sent as the command packets and calculates the color of all pixels making up the polygon from the color data of the apex points and from the Z-values specifying the depth. The GPU performs rendering processing of writing the pixel data in the frame buffer 18 responsive to the Z-value.

The GPU 15 also executes calculations, such as coordinate transformation or light source calculations, on the three-dimensional picture data sent as the object data by a processor, not shown, for generating internal drawing commands associated with respective polygons. The GPU executes rendering processing as described above.

The MDEC 14 is an I/O connection device operable in parallel with the CPU and is a device on the main bus 1 operating as the picture expansion engine. The MDEC 14 decodes picture data compressed and encoded by orthogonal transform, such as discrete cosine transform.

The sub-CPU 21 is a device on the sub-bus 2 operating by a program on the sub-memory 22. The sub-DMAC 23 is a device on the sub-bus 2 directed to the devices on the sub-bus for controlling DMA transfer. This sub-DMAC 23 acquires rights on the bus only when the bus controller 10 is closed. The SPU 25 is a device on the sub-bus 2 performing as a sound processor. This SPU 25 is responsive to the sound command sent from the sub-CPU 21 or sub-DMAC 23 as a command packet in order to read out sound source data from the sound memory 29 to output the read-out data. The ATM 26 is a device for communication on the sub-bus 2. The subsidiary storage device 27 is a data input/output device on the sub-bus 2 and is composed of a non-volatile memory such as a flash memory. The subsidiary storage device 27 transiently stores data such as data on the progress of the game or scores. The input device 28 is an input device, such as a man-machine interface, e.g., a mouse, or for input from other equipments, such as picture input or sound input devices, and reproduces the application program or necessary data from the CD-ROM.

Specifically, with the present video game device, the geometry processing means, configured for performing geometry processing, such as coordinate transformation, clipping or light source calculations, defining the three-dimensional model as a combination of the basic unit figures (polygons), such as triangles or quadrangles, formulating drawing commands for drawing a three-dimensional picture and transmitting the drawing commands associated with respective polygons as command packets to the main bus 1, is made up of the CPU 11 and the GTE 17 on the main bus 1, while the rendering processing means for generating pixel data of respective polygons based on the drawing commands from the geometry processing means for writing the pixel data in the frame buffer 18 for drawing a figure in the frame buffer 18 is made up of the GPU 15.

Figure 2:
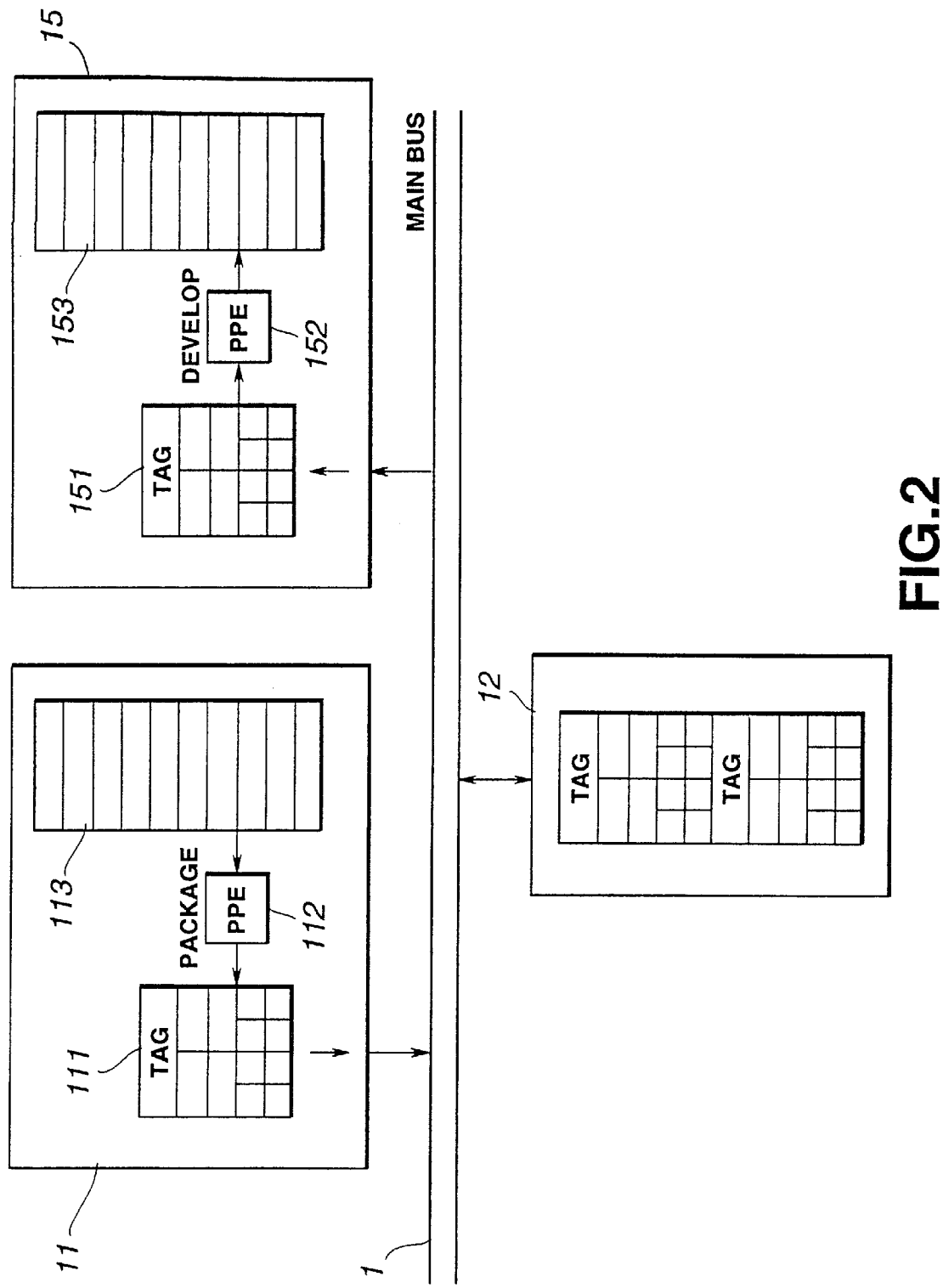
FIG. 2 is a schematic view showing the state of instalment of programmable packet engine PPE in the above video game device.

The PPE 112 on the side of the main CPU 11 making up the geometry processing means and the PPE 152 on the side of the GPU 15 making up the rendering processing means are placed between the inner registers 111, 151 by the first-in first-out (FIFO) memory in each processing unit and the input/output registers 113, 153 as shown in FIG. 2. The input/output buffers 111, 151 are constituted by bit lengths suited for data transfer algorithm, while the inner registers 113, 153 are constituted by bit lengths suited for calculations.

Figure 3:
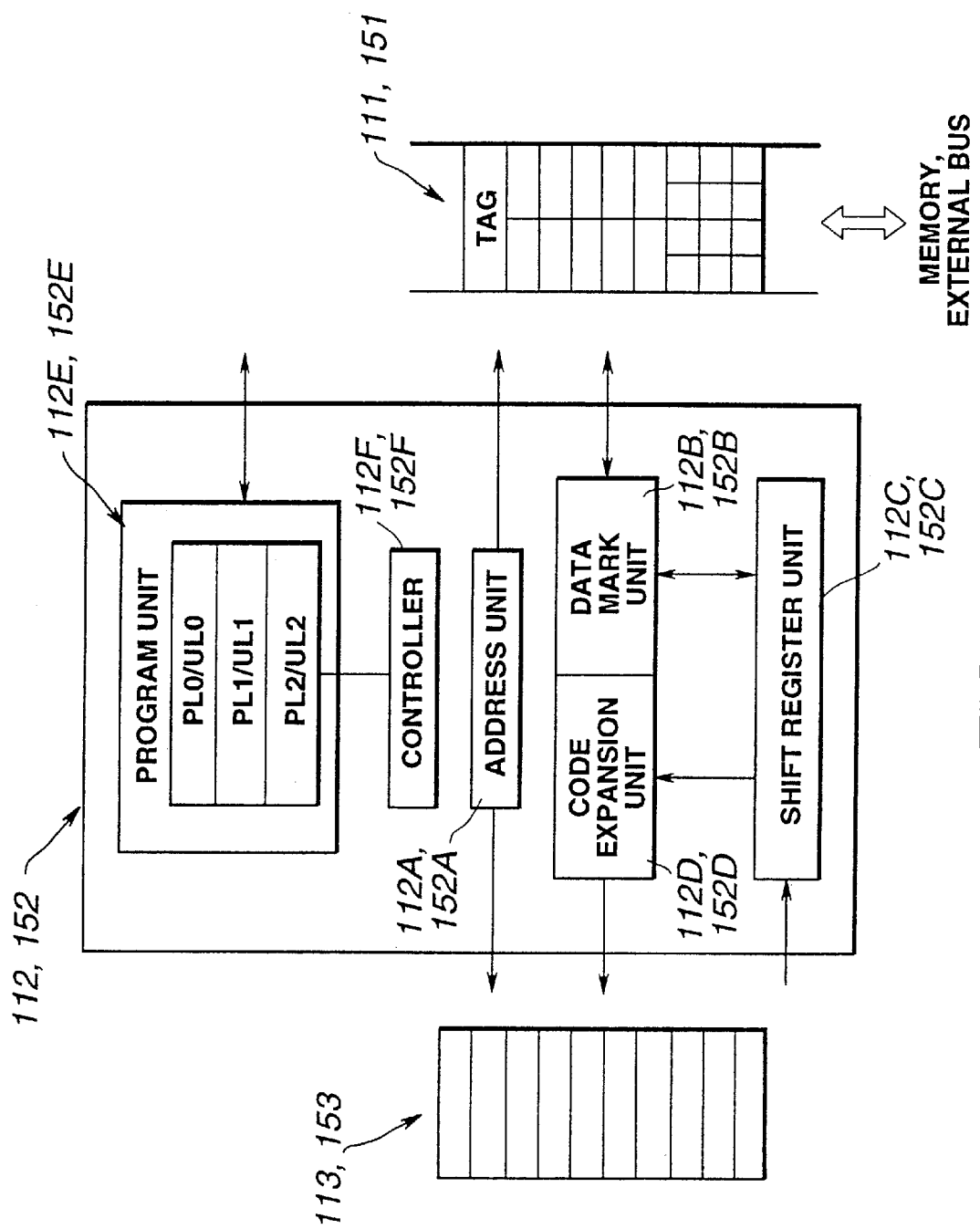
FIG. 3 is a block diagram showing the configuration of the PPE.

The PPEs 112, 152 are made up of address units 112A, 152A, designating the input output buffers 111, 151 and the inner registers 113, 153, data mask units 112B, 152B, shifters 112C, 152C, code expansion units 112D, 152D, program units 112E, 152E, where a list stating the sequences for packetizing/unpacketizing of data is recorded, and controllers 112F, 152F controlling various parts and read/write in accordance with the list of the program units 112E, 152E, as shown in FIG. 3. The PPEs 112, 152 are operated in parallel independently of the calculation control for executing data packetizing/unpacketizing in accordance with the sequence as indicated by the list in the program units 112E, 152E.

For example, the PPE 112 on the side of the main CPU 11, packetizing the drawing commands formulated based on the results of calculations by the GTE 17, formats the drawing commands in accordance with the sequence shown by the designated list designated by the selection of the list in the program unit 112E in order to form packets (packetizing). During this packetizing, the tag information specifying the unpacketizing sequence associated with the packetizing sequence indicated by the list is appended to the packet. The PPE 152 on the side of the GPU 15 re-formats the command packets in accordance with the sequence stated in the list specified by the tag information appended to the command packet sent from the CPU 11 or the main DMAC 13 by way of unpacketizing.

Specifically, three sorts of the packing lists PL0, PL1 and PL2 are recorded in the program unit 112E in the PPE 112 of the main CPU 11.

Figures 4A, 4B:
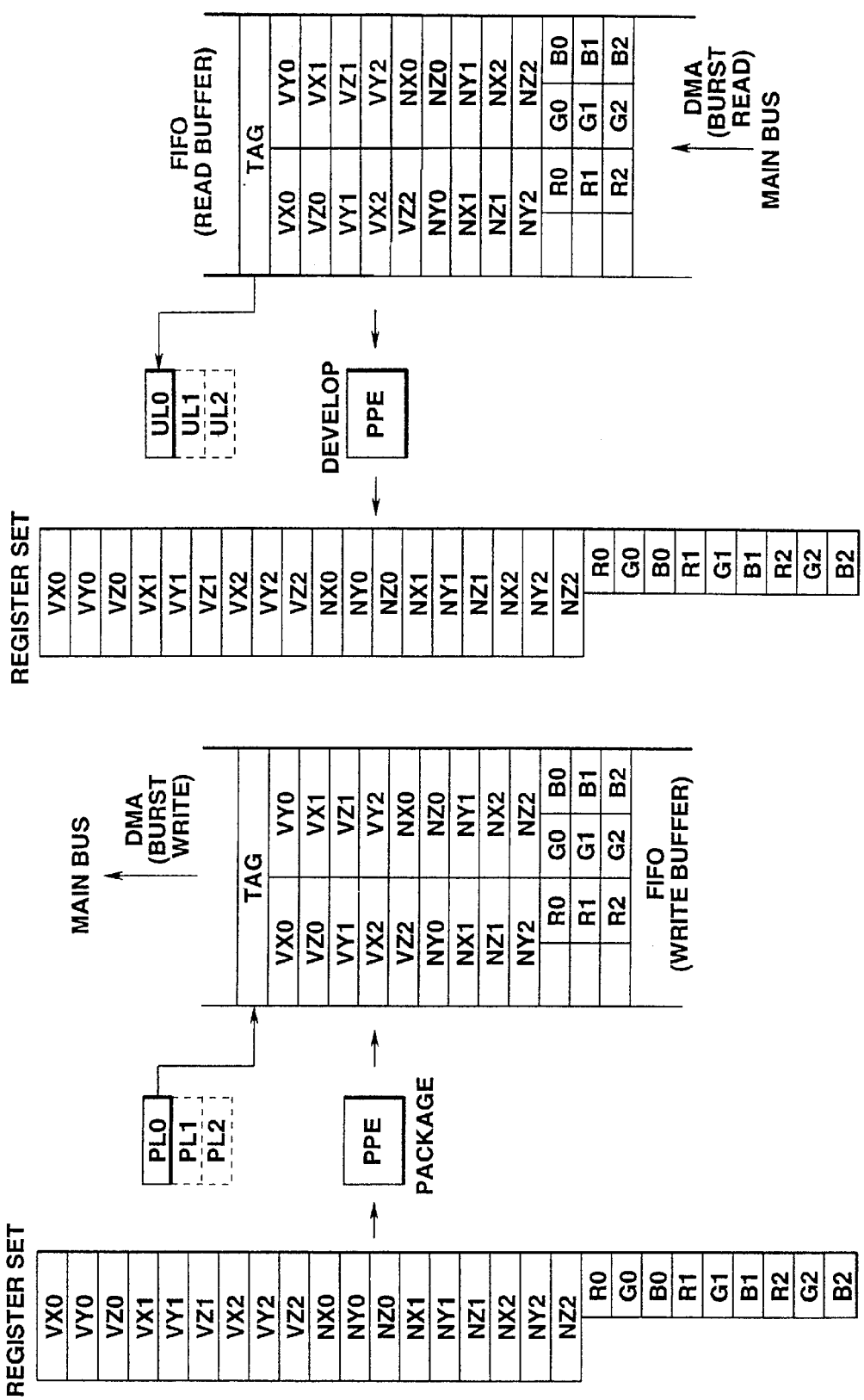
FIG. 4 shows a typical operation of the PPE.

In the packing list PL0 is stated the sequence for writing the three-dimensional information in the input output buffer 111 in the packetized form as packet command. The three-dimensional information is specified by apex point information (VX0, VY0, VZ0), (VX1, VY1, VZ1), (VX2, VY2, VZ2), generated as object data in the internal register 113 in the main CPU 11, normal line information at the apex points (NX0, NY0, NZ0), (NX1, NY1, NZ1), (NX2, NY2, NZ2), and the color information at the apex points (R0, G0, B0), (R1, G1, B1), (R2, G2, B2), as shown in FIG. 4(A). In the packing processing in accordance with the packing list PL0, the apex point information VX0, VY0, VZ0, VX1, VY1, VZ1,VX2, VY2, VZ2 and the normal line information NX0, NY0, NZ0, NX1, NY1, NZ1, NX2, NY2, NZ2, calculated by 32 bits, are packed as 16 bits, while the color information at the respective apex points R0, G0, B0, R1, G1, B1 R2, G2, B2 at the respective apex points, calculated by 16 bits, are packed in 16 bits in each apex point, that is in 16 bits made up of 5 bits each of R, G and B and a control bit used for semi-transparent processing. In addition, the tag information TAG specifying the unpacking list UL corresponding to the packing list PL0 is appended to the packed information.

Figures 5A, 5B:
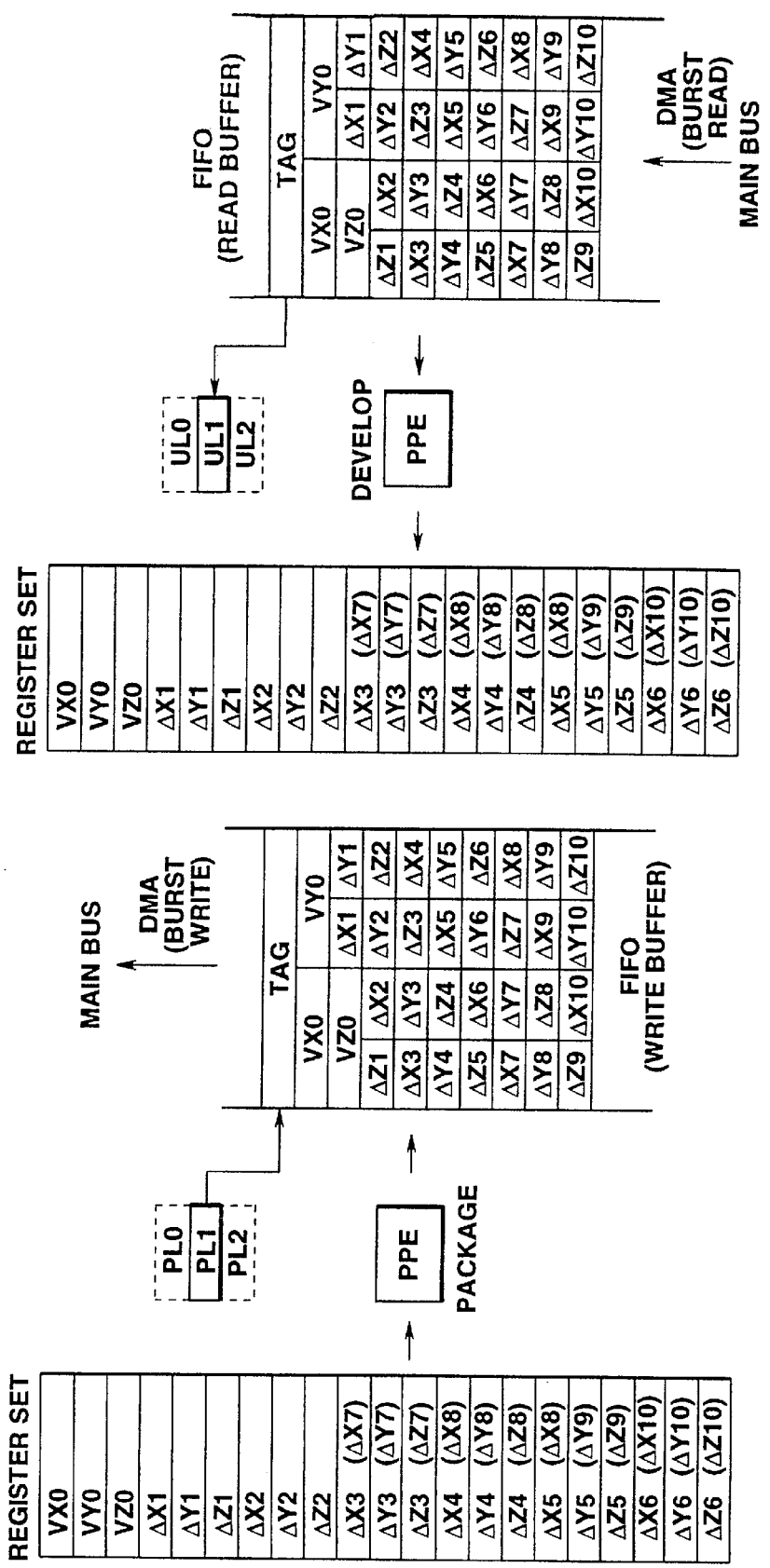
FIG. 5 shows another typical operation of the PPE.

In the packing list PL1, there is stated the sequence for packetizing the coupled triangular information constituted by apex point data (VX0, VY0, VZ0) and difference data (ΔX1, ΔY1, ΔZ1), (ΔVX2, ΔY2, ΔZ2), (ΔX3, ΔY3, ΔZ3) . . . as shown in FIG. 5(A). In the packing processing in accordance with the packing list PL1, the apex point information VX0, VY0, VZ0, calculated by 32 bits, is packed by 16 bits, while the difference data (ΔX1, ΔY1, ΔZ1), (ΔVX2, ΔY2, ΔZ2), (ΔX3, ΔY3, ΔZ3), calculated by 32 bits, is packed in 8 bits, while the tag information TAG designating the unpacking list PL1 is appended.

Figures 6A, 6B:
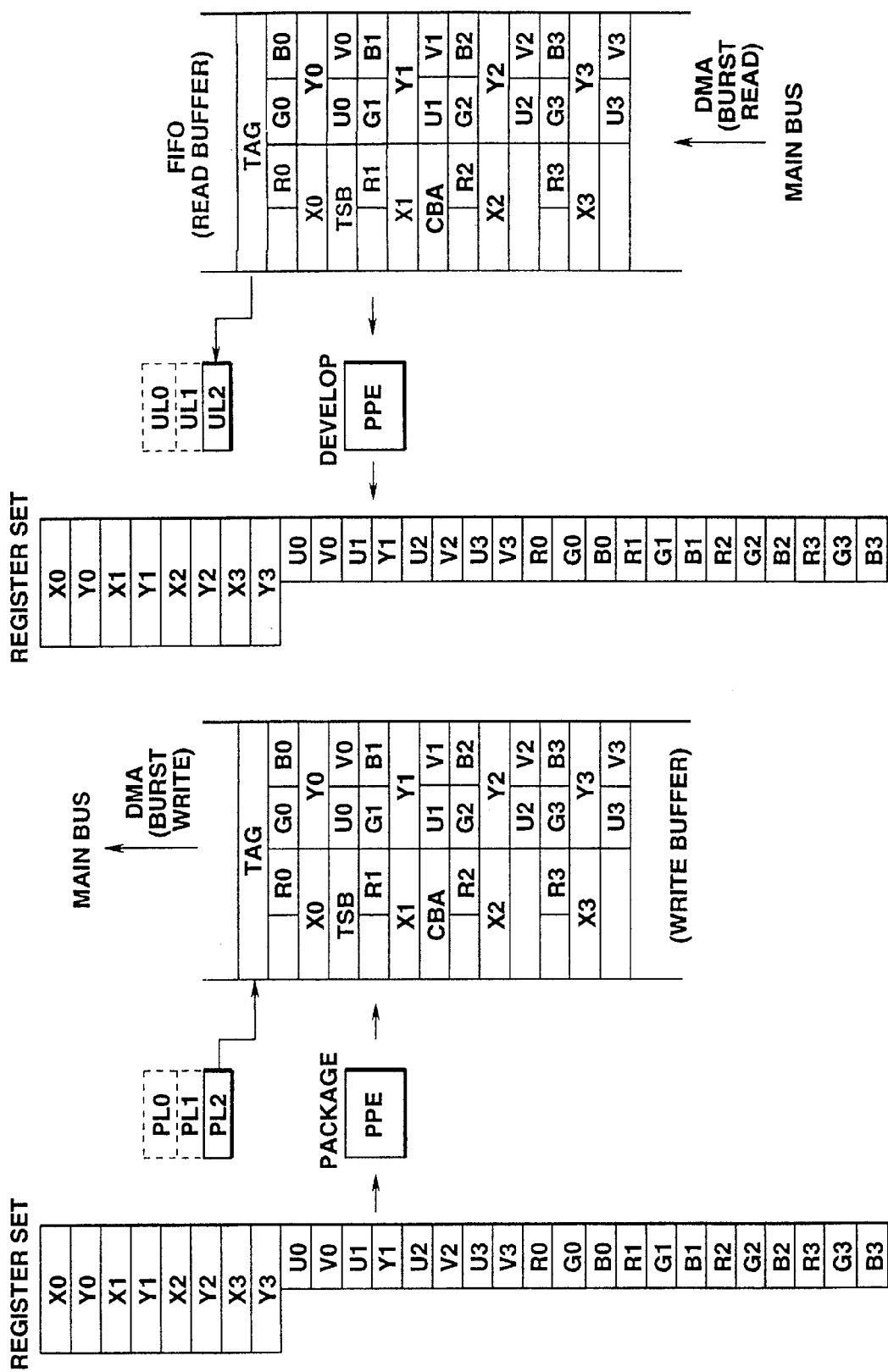
FIG. 6 shows still another typical operation of the PPE.
Figure 7B:
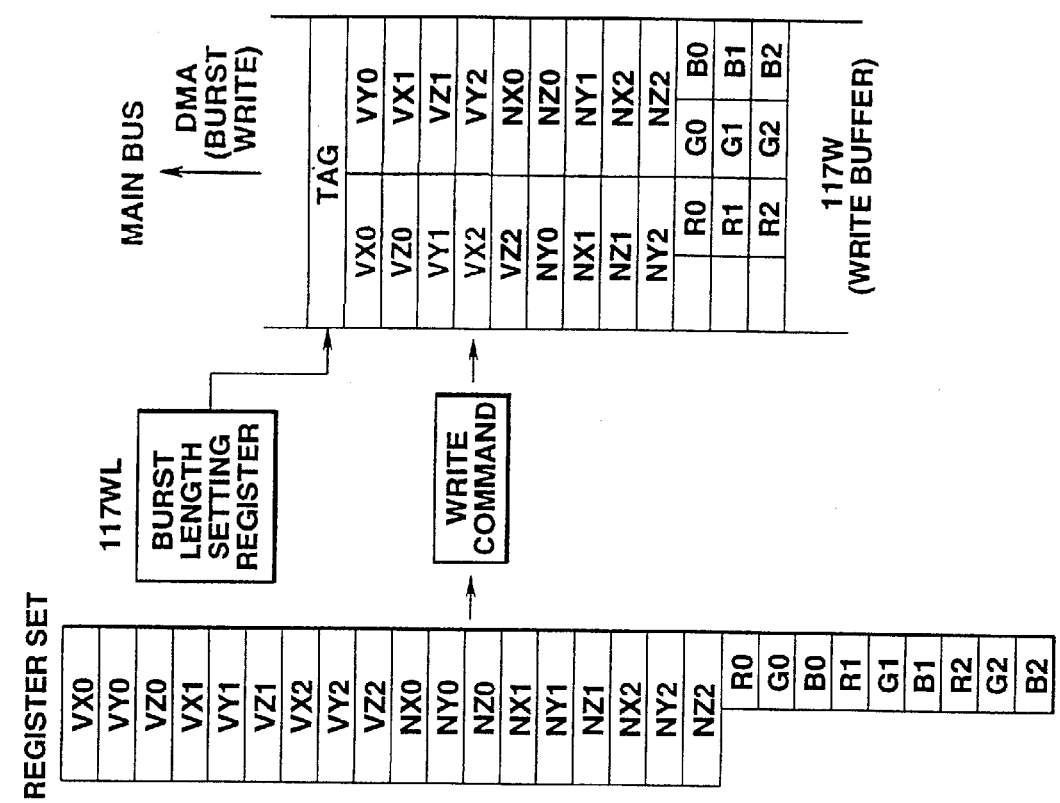
FIG. 7 shows a typical operation of a variable length read/write buffer VLBF in the above video game device.
Figure 7A:
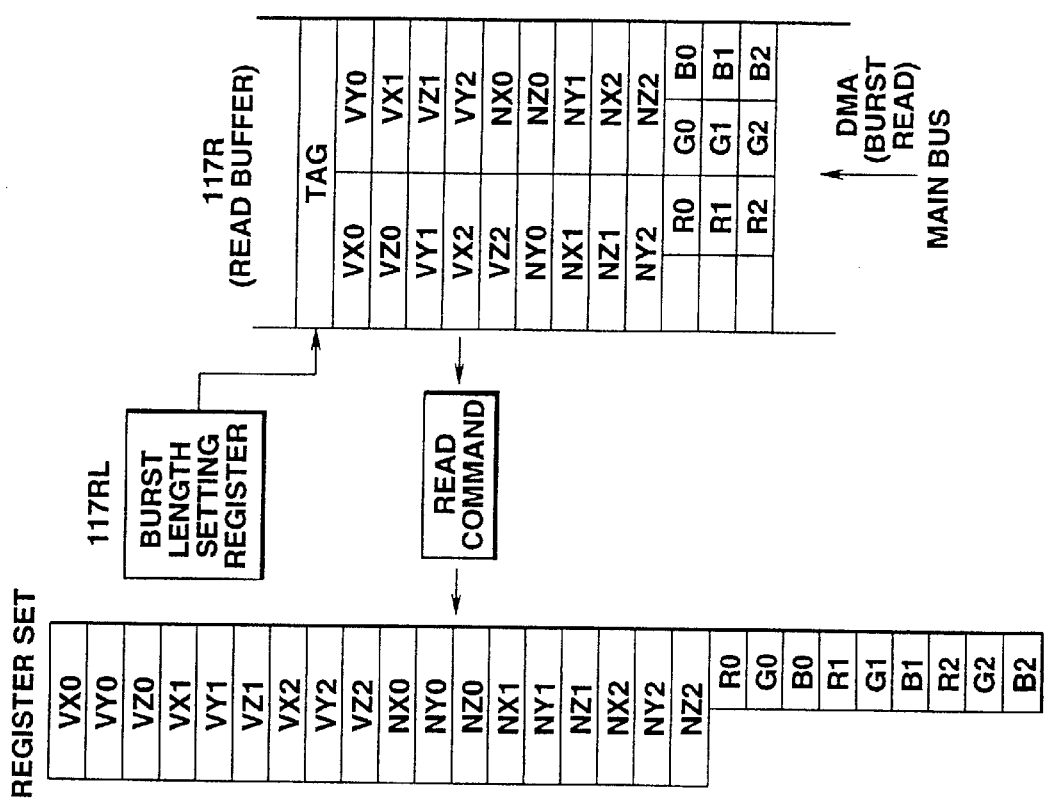

In the packing list PL2 is stated the sequence for packetizing the two-dimensional quadrangular information constituted by apex point coordinates (X0, Y0), (X1, Y1), (X2, Y2), (X3, Y3), set as drawing commands in the internal register 113 in the main CPU 11, the texture coordinates associated with the respective apex points (U0, V0), (U1, V1), (U2, V2),(U3, V3) associated with respective apex points and the color information (R0, G0, B0), (R1, G1, B1), (R2, G2, B2) and (R3, G3, B3), as shown in FIG. 6(A). In the packing processing, in accordance with the packing list PL2, the apex point coordinates X0, Y0, X1, Y1, X2, Y2, X3, Y3, calculated by 32 bits, are packed in 16 bits, while the texture coordinates U0, V0, U1, V1 U2, V2 U3, V3 and the color information R0, G0, B0, R1, G1, B1 R2, G2, B2, calculated by 16 bits, are packed in 8 bits, and the tag information TAG specifying the unpacking list ULZ associated with the packing list PL2 is appended.

In the program unit 152E in the PPE 152 of the GPU 15 are stated three unpacking lists PU0, PU1 and PU2 associated with the packing lists PL0, PL and PL2, respectively.

In the unpacking list UL0 is stated the sequence of writing the packet commands transferred to the input/output buffer 151 in the internal register 153, as shown in FIG. 4(B). The packet commands transferred to the input/output buffer 151 so as to be written in the internal register 153 are developed, based on the tag information TAG, into the three-dimensional triangular information specified by the 32-bit apex point information (VX0, VY0, VZ0), (VX1, VY1, VZ1), (VX2, VY2, VZ2), normal line information (NX0, NY0, NZ0), (NX1, NY1, NZ1), (NX2, NY2, NZ2), and the 16-bit color information (R0, G0, B0), (R1, G1, B1), (R2, G2, B2), as shown in FIG. 4(B).

In the unpacking list UL1 is stated the sequence of writing the packet commands transferred to the input/output buffer 151 in the internal register 153, as shown in FIG. 5(B). The packet commands transferred to the input/output buffer 151 so as to be written in the internal register 153 are developed, based on the tag information TAG, into the coupled triangular information constituted by the 32-bit apex point data (VX0, VY0, VZ0) and difference data (ΔX1, ΔY1, ΔZ1), (ΔVX2, ΔY2, ΔZ2), (ΔX3, ΔY3, ΔZ3).

In the packing list UL2 is stated the sequence of writing the packet commands transferred to the input/output buffer 151 in the internal register 153, as shown in FIG. 6(B). The packet commands transferred to the input/output buffer 151 so as to be written in the internal register 153 are developed, based on the tag information TAG, into the quadrangular information constituted by the 32-bit apex point coordinates (X0, Y0), (X1, Y1), (X2, Y2), (X3, Y3), 16-bit texture coordinates (U0, V0), (U1, V1), (U2, V2), (U3, V3) and the color information (R0, G0, B0), (R1, G1, B1), (R2, G2, B2), (R3, G3, B3) associated with respective apex points.

The VLBF 117, provided at the inlet outlet portion of the main CPU 11, is made up of a read buffer 117R and a write buffer 117W, associated with the longest burst transfer, and burst length setting registers 117RL, 117WL for setting the burst lengths. The burst length setting registers 117RL, 117WL are set to lengths suited to the reading and formulation of a packet processed in a cache-on particular routine at the leading end of the routine. This enables burst transfer suited to the packet form and improves the transfer efficiency.

Figure 8:
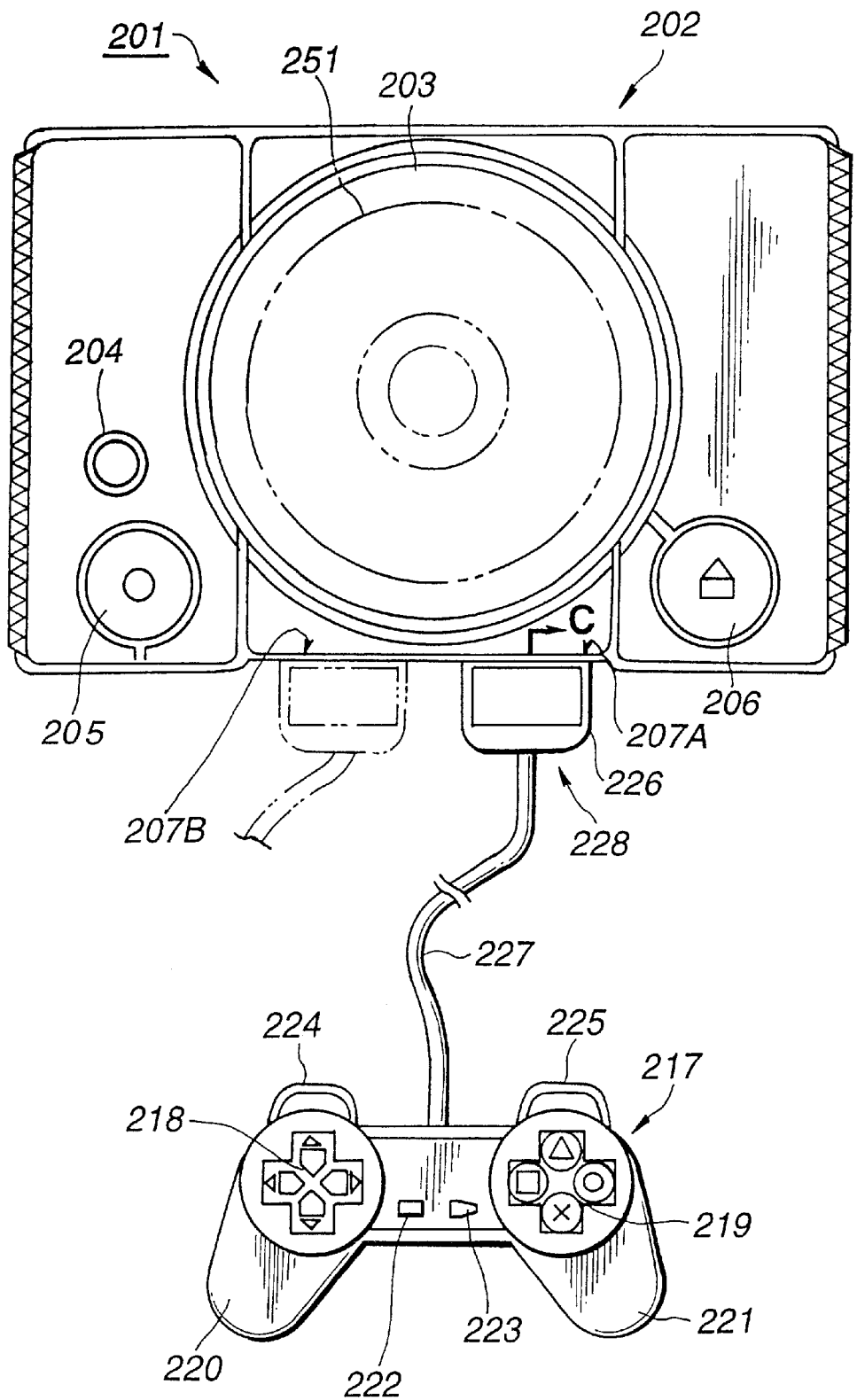
FIG. 8 is a plan view showing a video game device embodying the present invention.
Figure 9:
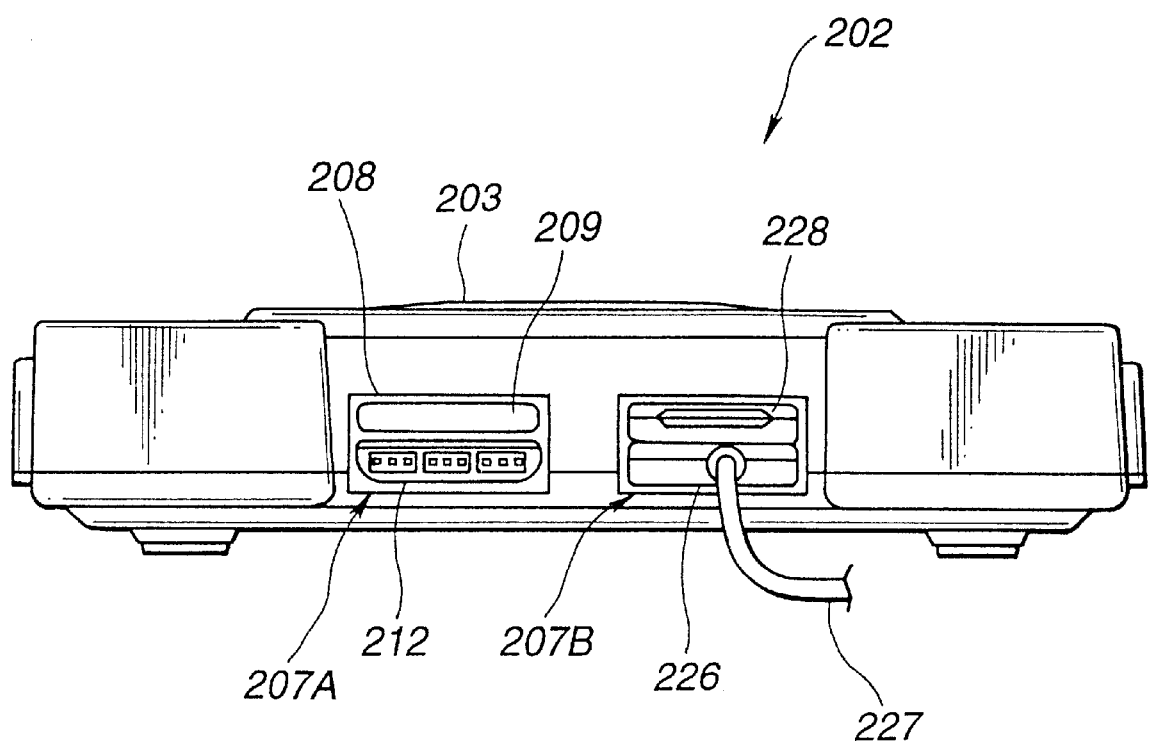
FIG. 9 is a back side view of the video game device.
Figure 10:
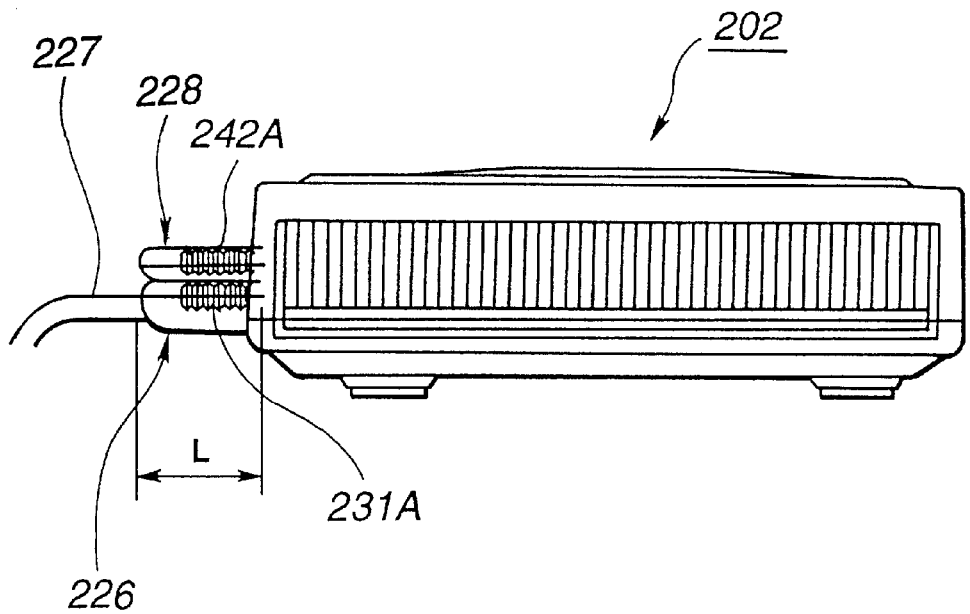
FIG. 10 is a side view of the video game device.

The above-described video game device according to the present invention is configured as shown in a plan view of FIG. 8, a front view of FIG. 9 and a side view of FIG. 10.

Figure 11:
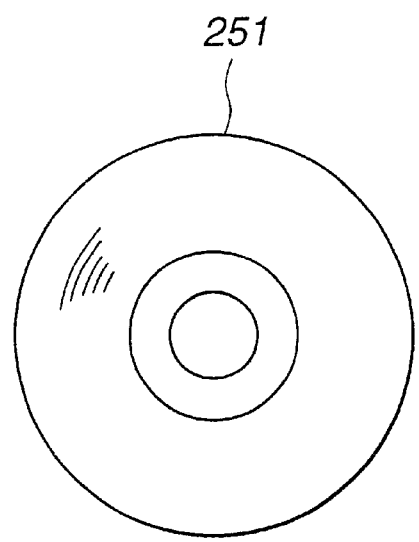
FIG. 11 is a plan view of a CD-ROM mounted on the video game device.

Specifically, FIG. 8 shows a video game device 201 basically made up of a main body portion 202 and an operating device 217 connected via a cable 227 to the main body portion 202. At a mid portion on the upper surface of the main body portion 202 is mounted a disc loading unit 203 within which is loaded a CD-ROM 251 shown in FIG. 11. On the left side of the disc loading unit 203 are mounted a power source switch 205 actuated on power up or power down, and a reset switch 204 actuated for transiently resetting the game. On the right side of the disc loading unit 203 is mounted a disc actuating switch 206 actuated when loading/unloading the CD-ROM 251 to the disc loading unit 203.

On the front side of the main body portion 202 are mounted connecting portions 207A, 207B, as shown in FIG. 9. These connecting portions 207A, 207 are each provided with a connection terminal portion 226 provided at the leading end of a cable 227 led out from the operating device 217, a connection terminal insertion portion 212 configured for connecting a recording device 228, such as a memory card, and a recording insertion portion 208. Specifically, the main body portion 202 can be connected to two each of the operating devices 217 and the recording devices 228.

The front view of FIG. 9 shows the state in which the connection terminal portion 226 and the recording device 228 are connected to the right-side connecting portion 207B, while none of the connection terminal portions 226 or the recording device 228 is connected to the left side connection portion 207A. Referring to FIG. 9, a shutter 209 is provided on the recording insertion device 208 used for loading a recording device 238. When loading the recording device 238 on the main body portion 202, the shutter 209 is thrust by the distal end of the recording device 228 for loading.

The connection terminal portion 226 has a grip 231A, while the recording device 238 has a grip 242A. The grips are machined for slip-proofing, such as by knurling. The length of the connection terminal portion 226 and that of the recording device 238 are of the same length L.

The operating device 17 has supports 220, 221 that can be held by left and right hands. On the distal ends of the supports 220, 221 are provided operating portions 218, 219. The operating portions 224, 225 can be operated by index fingers of left and right hands, while the operating portions 218, 219 are operated by thumb fingers of left and right hands.

Between the operating portions 218, 219 are provided a selection switch 222 actuated when performing a selection operation during the game and a start switch 223 actuated when starting the game.

In the present video game device 201, the CD-ROM 251 loaded on the disc loading unit 203 is reproduced by the CD-ROM drive 30. The operating device 217 is equivalent to the above-mentioned input device 28, while the recording device 228 corresponds to the subsidiary storage device 27.

What is claimed is:

1. A picture processing apparatus having a plurality of picture processing units interconnected over an external bus and a memory, wherein the improvement comprises:
    a first packet engine at a data inlet stage of at least one picture processing unit, wherein said first packet engine can modify a data unpacketizing sequence;
    a second packet engine for packetizing data at a data output stage of another picture processing unit; and
    wherein said first and second packet engines have sequence selection means for selecting the data packetizing/unpacketizing sequence, said second packet engine appending tag information specifying the data packetizing/unpacketizing sequence as selected during packetizing by said sequence selection means to a packet, said first packet engine selecting the sequence as designated by said tag information during unpacketizing by said sequence selection means.

2. The picture processing apparatus as claimed in claim 1, comprising:
    a first picture processing unit having a geometry processing function of defining a three-dimensional model as a combination of unit figures for fomulating drawing commands for drawing a three-dimensional figure, said first picture processing unit packetizing the drawing commands thus formulated to send the packetized drawing commands by said first packet engine as a command packet over an external bus; and
    a second picture processing unit, as said picture processing units, for unpacketizing the command packet sent from the first picture processing unit by said first packet engine, interpreting the drawing command sent as the commmand packet and performing the rendering processing of writing the pixel data in a frame buffer.

3. A picture processing method carried out by a picture processing apparatus having a plurality of picture processing units interconnected over an external bus and a memory, wherein the improvement comprises:
    performing data unpacketizing by a first packet engine at a data inlet stage of at least one picture processing unit, said first packet engine being capable of modifying a data unpacketizing sequence;
    performing data packetizing by a second packet engine provided at a data output stage of another picture processing unit; and
    wherein said second packet engine appends the appendage information specifying the unpacketizing sequence associated with the packetizing sequence to a packet at the time of data packetizing, and wherein data unpacketizing is performed by said first packet engine in accordance with the sequence specified by said appendage information at the time of data unpacketizing.

4. A picture processing method carried out by a picture processing apparatus having a plurality of picture processing units inteconnected over an external bus and a memory, wherein the improvement comprises:
    performing data unpacketizing by a first packet engine at a data inlet stage of at least one picture processing unit, said first packet engine being capable of modifying a data unpacketizing sequence;
    packetizing data by a second packet engine provided at a data output stage of another picture processing unit; and
    selecting the data packetizing/unpacketizing sequence during data packetizing and appending tag information specifying the selected data unpacketizing sequence to a packet, by said second packet engine, and selecting the unpacketizing sequence as designated by said tag information during data unpackaging by said first packet engine for performing the data unpackaging.

5. The picture processing method as claimed in claim 4 comprising:
    performing, by a first picture processing unit, geometry processing of defining a three-dimensional model as a combination of unit figures for fomulating drawing commands for drawing a three-dimensional figure, packetizing the drawing commands thus fomulated by the second packet engine and sending the packetized commands as a command packet over an external bus; and
    unpacketizing the command packet sent from the first picture processing unit by said first packet engine, in a second picture processing unit, interpreting the drawing command sent as the command packet and performing the rendering processing of writing the pixel data in a frame buffer.

* * * * *

UNITED STATES PATENT AND TRADEMARK OFFICE
CERTIFICATE OF CORRECTION

PATENT NO. : 6,369,823 B2  Page 1 of 1
DATED : April 9, 2002
INVENTOR(S) : Akio Ohba It is certified that error appears in the above-identified patent and that said Letters Patent is hereby corrected as shown below:

Column 9,
Line 58, change "by said first packet" to -- by said second packet --.

Signed and Sealed this

Sixth Day of September, 2005

JON W. DUDAS
*Director of the United States Patent and Trademark Office*